(12) United States Patent
Walenty et al.

(10) Patent No.: US 6,618,660 B2
(45) Date of Patent: Sep. 9, 2003

(54) ANTI-LOCK BRAKE YAW CONTROL METHOD

(75) Inventors: Allen John Walenty, Macomb, MI (US); Kevin Gerard Leppek, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/976,886

(22) Filed: Oct. 15, 2001

(65) Prior Publication Data

US 2003/0074125 A1 Apr. 17, 2003

(51) Int. Cl.[7] .......................... B60B 39/00; B60T 7/12; B60T 8/24; G06G 1/00; B60G 23/00
(52) U.S. Cl. .............................. 701/71; 701/72; 701/73; 701/74; 701/75; 701/76; 701/38; 280/5.507; 303/155
(58) Field of Search ............................. 701/71, 72, 73, 701/74, 75, 76, 38; 280/5.507; 303/155, 146, 153, 139

(56) References Cited

U.S. PATENT DOCUMENTS

| | | | | |
|---|---|---|---|---|
| 5,732,376 A | * | 3/1998 | Hrovat et al. | 701/80 |
| 5,746,486 A | * | 5/1998 | Paul et al. | 303/146 |
| 6,345,225 B1 | * | 2/2002 | Bohm et al. | 701/70 |
| 6,385,523 B1 | * | 5/2002 | Yokoyama et al. | 701/70 |
| 6,438,482 B1 | * | 8/2002 | Baumann et al. | 701/70 |
| 6,533,367 B1 | * | 3/2003 | Latarnik et al. | 303/139 |

* cited by examiner

Primary Examiner—Jacques H. Louis-Jacques
Assistant Examiner—Brian J. Broadhead
(74) Attorney, Agent, or Firm—Christopher DeVries

(57) ABSTRACT

An improved anti-lock rear brake yaw control method utilizes a measure of braking intensity to regulate both the initiation of yaw control and the anti-lock braking control parameters once yaw control is initiated. The brake torque and the rate of brake pedal depression provide measures of braking intensity, and are used to develop variable slip and deceleration thresholds to which the rear wheel differential slip and deceleration are compared. The variable thresholds permit initiation of yaw control at relatively low levels of differential wheel slip or deceleration during panic braking, while requiring higher levels of differential wheel slip or deceleration to initiate yaw control during moderate braking. Once yaw control is initiated, the slip and deceleration thresholds are utilized to adaptively adjust the slip and deceleration targets, so that the targets are set in accordance with the slip and deceleration of the rear wheel with the lowest coefficient of friction during panic braking, and at higher levels during moderate braking.

10 Claims, 4 Drawing Sheets

ANTI-LOCK BRAKE YAW CONTROL METHOD

TECHNICAL FIELD

This invention relates to motor vehicle anti-lock brake systems, and more particularly to a method of controlling rear brake pressure modulation for yaw control on split or uneven coefficient of friction road surfaces.

BACKGROUND OF THE INVENTION

It is well known that activating the brakes of a motor vehicle while driving on split or uneven coefficient of friction road surfaces creates a yaw moment, possibly requiring corrective steering by the driver to maintain a desired heading. This phenomenon can be substantially eliminated by modulating the rear brake pressure based on the slip and deceleration of the rear wheel on the lower coefficient surface. However, since this strategy unnecessarily lowers the braking effort at the rear wheel on the higher coefficient surface, the vehicle stability improvement is achieved at the expense of stopping distance. Accordingly, what is needed is a brake control that provides a better balance between yaw control and braking effort.

SUMMARY OF THE INVENTION

The present invention is directed to an improved rear brake yaw control method that utilizes a measure of braking intensity to regulate both the initiation of yaw control and the braking control parameters once yaw control is initiated. The brake torque and the rate of brake pedal depression provide measures of braking intensity, and are used to develop variable slip and deceleration thresholds to which the rear wheel differential slip and differential deceleration are compared. The variable thresholds permit initiation of yaw control at relatively low levels of differential wheel slip or deceleration during panic braking, while requiring higher levels of differential wheel slip or deceleration to initiate yaw control during moderate braking. Once yaw control is initiated, the slip and deceleration thresholds are utilized to adaptively adjust the slip and deceleration targets, so that the targets are set in accordance with the slip and deceleration of the lowest coefficient rear wheel during panic braking situations, and at levels that provide more aggressive braking during moderate braking situations. In this way, yaw control is initiated and carried out in a manner that provides yaw control at a level that is suited to the braking conditions, so that vehicle stability is improved without unnecessarily increasing the vehicle stopping distance. In a preferred embodiment of the invention, the brake torque is estimated based on a periodically updated characterization of vehicle deceleration vs. brake pedal position during vehicle braking when anti-lock braking is not activated.

DESCRIPTION OF THE PREFERRED EMBODIMENT

Figure 1:
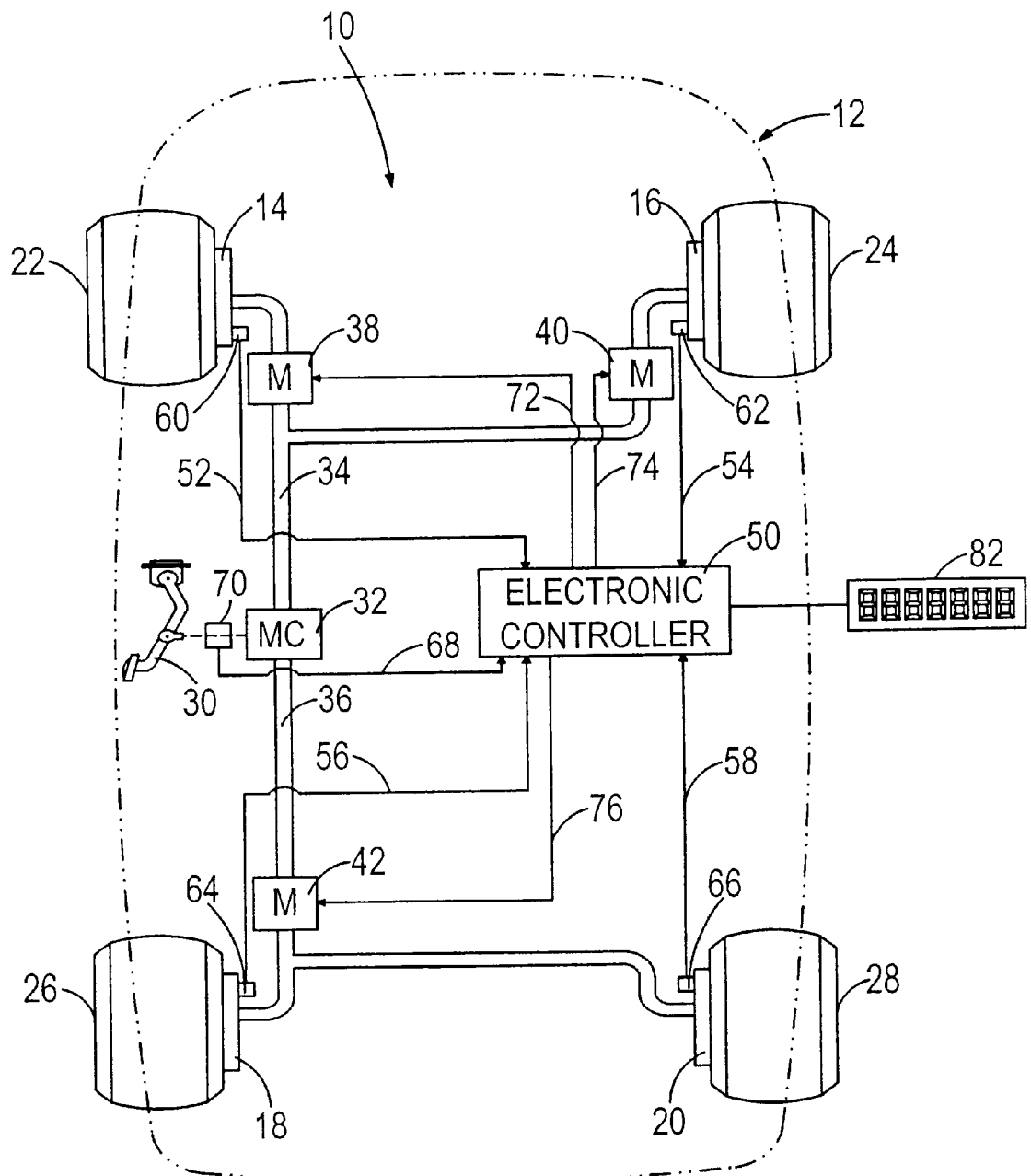
FIG. 1 is a schematic diagram of a vehicle anti-lock braking system, including a brake pedal position sensor, and a microprocessor-based control unit programmed to carry out the method of this invention.

Referring to FIG. 1, the present invention is disclosed in the context of an anti-lock braking system 10 for a vehicle 12 having hydraulically-activated friction brakes 14, 16, 18, 20 at each of four vehicle wheels 22, 24, 26, 28. A driver-manipulated brake pedal 30 is mechanically coupled to a master cylinder (MC) 32 for producing hydraulic pressure in proportion to the force applied to pedal 30. Master cylinder 32, which may include a pneumatic booster (not shown), proportions the hydraulic pressure between front and rear brake supply lines 34 and 36 in a conventional manner. Front supply line 34 is coupled to the left front service brake 14 via left-front anti-lock modulator (M) 38, and to the right front service brake 16 via right-front anti-lock modulator (M) 40. Rear supply line 36 is coupled to the left and right rear wheel brakes 18, 20 via rear anti-lock modulator (M) 42 so that both left and right rear wheel brakes 18, 20 receive the same brake pressure.

A microprocessor-based control unit 50 receives various inputs, including wheel speed signals on lines 52, 54, 56, 58 from respective wheel speed sensors 60, 62, 64, 66 and a brake pedal position signal PP on line 68 from pedal position sensor 70. The sensors 60, 62, 64, 66 and 70 may be implemented with conventional devices in a manner known to those skilled in the art. In response to the various inputs, the control unit 50 outputs modulator control signals to modulators 38, 40, 42 on lines 72, 74, 76 during wheel lock-up conditions, and diagnostic information signals on line 80 for display on a driver information device 82.

In a conventional system, the control unit 50 independently activates the modulators 38, 40, 42 to control wheel slip. To minimize yaw moments due to braking on uneven or split coefficient of friction road surfaces, the control unit 50 carries out a yaw control, commonly referred to as "select low", in which the rear brake pressure is modulated based on the slip and deceleration of the low-coefficient rear wheel 18, 20. In other words, the braking effort at both rear wheels 18, 20 is reduced to the level required to control slip at the low-coefficient rear wheel, even though the braking effort could be significantly increased without wheel-slip at the high-coefficient rear wheel. The present invention is based on the premise that yaw control is most important in extreme/panic braking situations, and less important during moderate braking where the driver can more easily maintain vehicle stability with corrective steering of the front wheels 14, 16. According to the invention, the control unit 50 determines the difference in slip and deceleration between the rear wheels 18, 20, and initiates yaw control if the differential slip or deceleration values exceed respective slip and deceleration thresholds. The slip and deceleration thresholds have default values that require a calibrated amount of differential slip or deceleration to occur before yaw control is initiated, but are reduced in proportion to both brake torque and brake pedal apply rate so that yaw control is initiated very quickly in a panic braking situation. If yaw control is not initiated, the rear brake pressure can be based on a calibrated percentage of the slip and deceleration of the high-coefficient rear wheel (i.e., the rear wheel having the lowest slip and deceleration) for enhanced rear wheel braking effort. If yaw control is initiated, the rear brake pressure is based on the slip and deceleration of the low-coefficient rear wheel (i.e., the rear wheel having the highest slip and deceleration), reduced in accordance with the respective slip and deceleration thresholds. In a panic braking situation, for example, the slip and deceleration thresholds will be at a minimum, essentially resulting in a select low control. In a moderate braking situation, the slip and deceleration thresholds will substantially reduce the measured slip and deceleration values of the low-coefficient rear wheel, resulting in increased rear wheel braking while allowing a certain amount of yaw moment that can be corrected by driver steering input. In this way, yaw control is initiated and carried out in a manner that provides yaw control at a level that is suited to the braking conditions, so that vehicle stability is improved without unnecessarily increasing the vehicle stopping distance.

Figure 2:
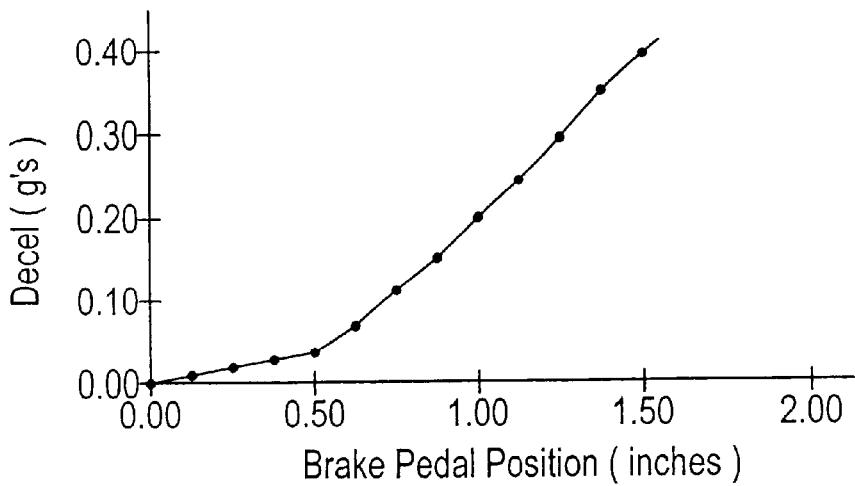
FIG. 2 is a graph depicting vehicle deceleration as a function of brake pedal position for the braking system of FIG. 1.
Figure 3:
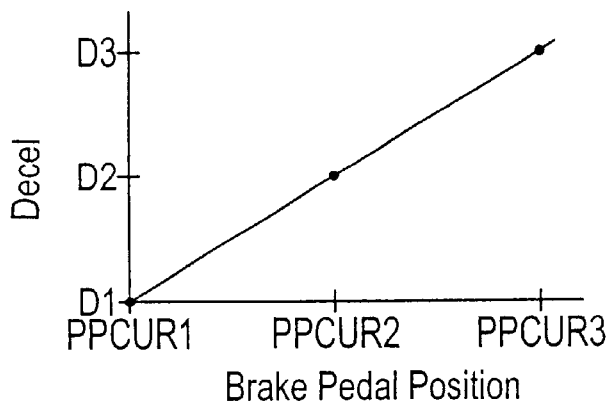
FIG. 3 is a graph depicting an exemplary characterization of brake system effectiveness according to this invention.

In a preferred embodiment of the invention, the brake torque is estimated based on a periodically updated characterization of vehicle deceleration vs. brake pedal position during vehicle braking when anti-lock braking is not activated. FIG. 2 graphically depicts a representative relationship between vehicle deceleration and brake pedal position for defined braking of the vehicle 12, assuming that there is no lock-up condition and the modulators 38, 40, 42 are inactive. Typically, the "knee" portion of the relationship varies considerably from stop to stop, whereas the portion of the relationship above the knee tends to be linear and repeatable from stop to stop. For this reason, the knee portion of the relationship is ignored for purposes of this invention, and the brake pedal position vs. vehicle deceleration relationship is characterized only for pedal positions and vehicle decelerations in the linear portion above the knee. In the illustrated embodiment, for example, the characterization data is collected by determining the pedal position corresponding to three different vehicle deceleration values identified in FIG. 3 as D1, D2 and D3. Of course, any number of data points may be used, and the data points may be defined in terms of pedal position, if desired. In any case, the braking data is only collected during braking operation when the pedal 30 is depressed at a "normal" rate or held at an essentially static position; data is not collected upon release of the pedal 30 or during panic braking. This eliminates the need to compensate for the effects of suspension and powertrain dynamics, tire and sensor dynamics, and so on. The vehicle acceleration at the onset of braking is saved and subtracted from the deceleration during braking operation in order to compensate for the effects of engine braking and road grade. Of course, the road grade and other factors such as vehicle weight and the effects of brake heating may be estimated and used to compensate the collected braking data; see, for example, U.S. Pat. No. 6,212,458 to Walenty et al., issued on Apr. 3, 2001, and incorporated herein by reference. FIG. 3 graphically depicts a representative characterization table for braking system 10, based on pedal position values PPCUR1, PPCUR2 and PPCUR3, corresponding to respective vehicle deceleration values D1, D2 and D3.

The characterization table is periodically updated to reflect a current condition of the braking effectiveness, and the brake torque BRAKE_TQ for any brake pedal position PP greater than or equal to PPCUR1 can be determined according to the expression:

$$BRAKE\_TQ=[((PP-PPCUR1)*(PPCUR3-PPCUR1)/(D3-D1))*Kbt]+(UPDATE\_BRAKE\_HEAT-BRAKE\_HEAT)*Kheat \quad (1)$$

where Kbt is a brake torque constant, UPDATE_BRAKE_HEAT is the estimated brake temperature when the characterization table was last updated, BRAKE_HEAT is a current estimate of the brake temperature, and Kheat is a constant for converting the quantity (UPDATE_BRAKE_HEAT−BRAKE_HEAT) to a corresponding difference in brake torque. Thus, the brake torque obtained from the characterization table is compensated for differences in brake temperature; for example, BRAKE_TQ is reduced if BRAKE_HEAT is higher than UPDATE_BRAKE_HEAT, and vice-versa.

The brake temperature term BRAKE_HEAT can be modeled reasonably well, and is continuously updated regardless of whether the brakes are activated. For example, BRAKE_HEAT may be estimated as:

$$BRAKE\_HEAT=BRAKE\_HEAT-((VSPD+K1)^2*K2)*(BRAKE\_HEAT-(BRAKE\_HEAT*Tamb)+(BRAKE\_TQ*Kheat*VSPD)*(K3-BRAKE\_HEAT)/K3 \quad (2)$$

where K1, K2 and K3 are constants, Tamb is the ambient temperature, and VSPD is the vehicle speed.

Figure 4:
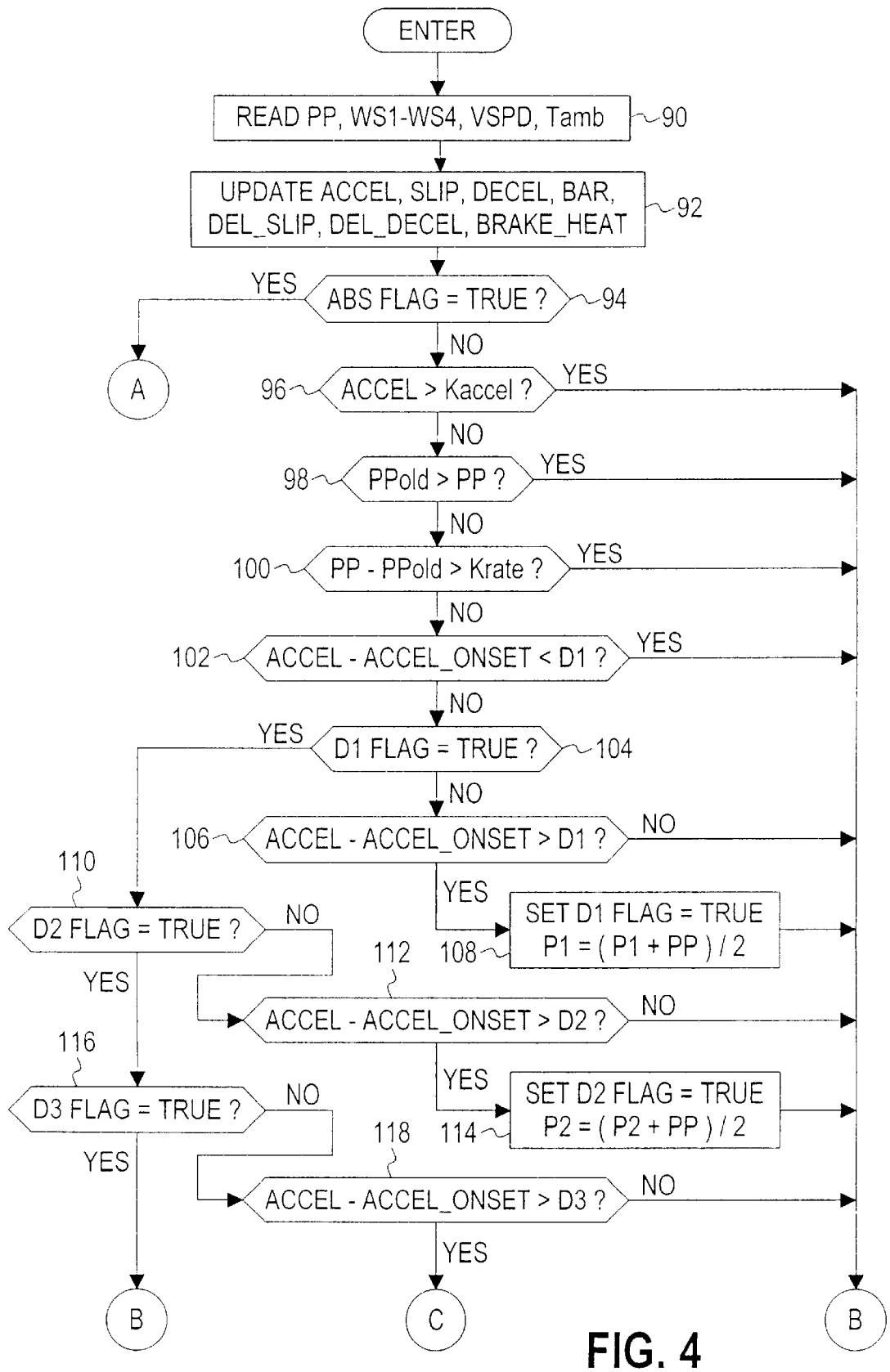
FIGS. 4–5 depict a computer software routine executed by the control unit of FIG. 1 for carrying out the control method of this invention.
Figure 5:
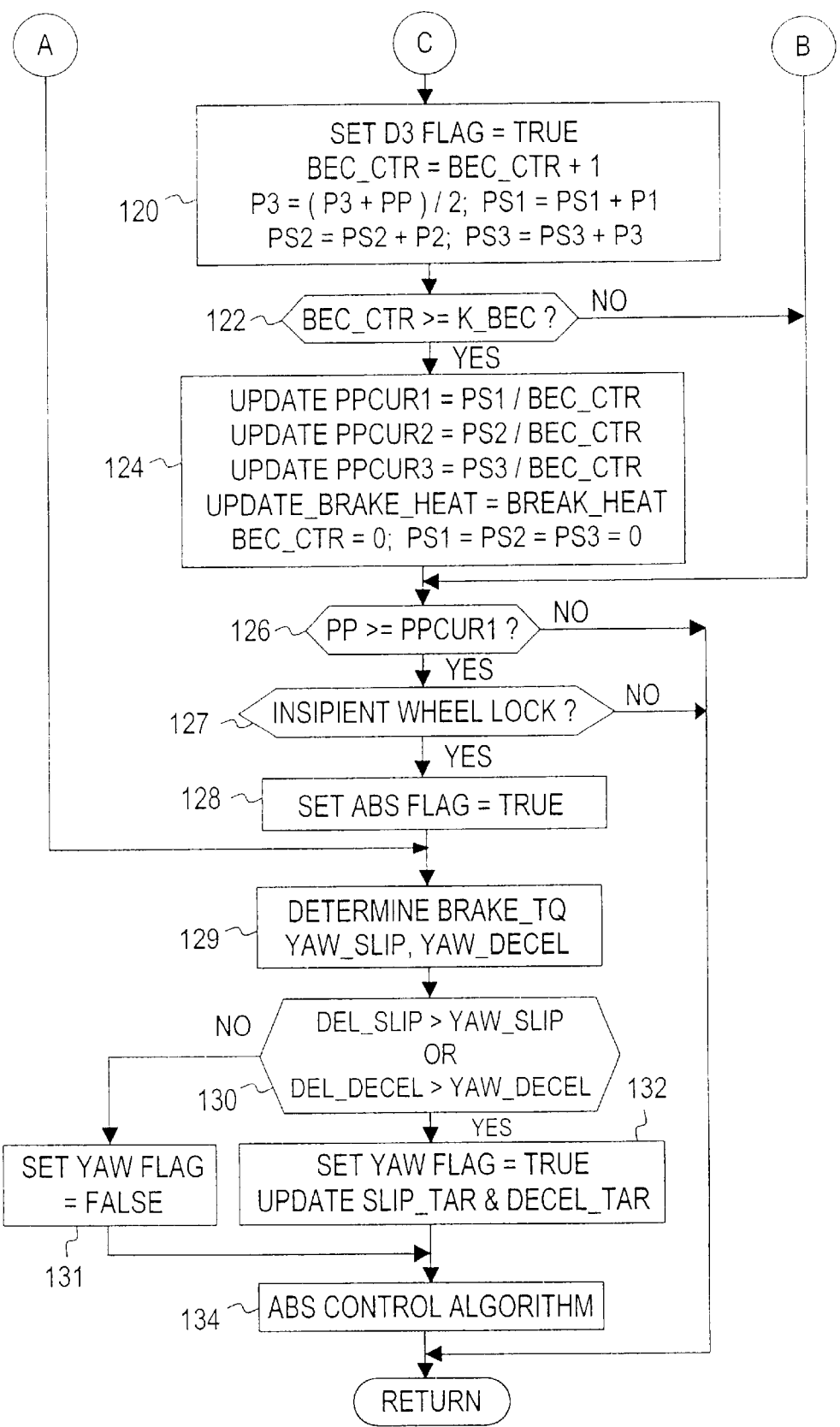

The flow diagram of FIGS. 4–5 depicts a software routine that is periodically executed by control unit 50 of FIG. 1 to collect the braking system characterization data and to carry out the yaw control method of this invention. Referring to FIG. 4, the input processing blocks 90 and 92 are first executed to read the brake pedal position PP, the wheel speeds (WS1–WS4), the vehicle speed VSPD and the ambient temperature Tamb, to update BRAKE_HEAT using equation (2), and to compute various values including the vehicle acceleration ACCEL, the wheel slip and deceleration values (SLIP, DECEL), the brake apply rate BAR, and the differential rear slip and deceleration values (DEL_SLIP, DEL_DECEL). For example, BAR may be defined as (PPnew−PPold)/T, where PPnew and PPold are new and old values of the pedal position PP, and T is the execution rate of the routine. The differential values DEL_SLIP and DEL_DECEL may be defined as follows:

$$DEL\_SLIP=|SLIP_{lr}-SLIP_{rr}| \quad (3)$$

$$DEL\_DECEL=|DECEL_{lr}-DECEL_{rr}| \quad (4)$$

where the subscripts "lr" and "rr" respectively denotes the left-rear and right-rear wheel 18 and 20. Also, the vehicle acceleration when the brake pedal 30 is initially depressed is saved as the onset acceleration ACCEL_ONSET. Block 94 then checks the ABS FLAG to determine if anti-lock brake control is active. Ordinarily, the ABS FLAG is FALSE, and a portion of the routine comprising the blocks 96–124 is executed to collect braking system characterization data; otherwise, the data collection portion of the routine is skipped, and the blocks 128–134 are executed to determine if yaw control should be initiated, and to carry out the ABS control algorithm.

In the data collection portion of the routine, the blocks 96–102 are first executed to detect the presence of braking activity that is suitable for brake system characterization. Block 96 determines if ACCEL exceeds a relatively high threshold acceleration=Kaccel, block 98 determines if the previous pedal position PPold is greater than the current value PP, block 100 determines if the difference (PP−PPold) exceeds a threshold rate Krate, and block 102 determines if the difference (ACCEL−ACCEL_ONSET) is less than the minimum deceleration table entry D1. Each of the blocks 96, 98, 100, 102 must be answered in the negative to proceed with data collection; thus, a "normal" braking condition is defined as one in which (1) ACCEL<Kaccel, (2) PPold<PP, (3) PP−PPold<Krate, and (4) ACCEL−ACCEL_ONSET>D1. Stated oppositely, "normal" braking for purposes of data collection does not include (1) panic braking, (2) high rate brake pedal movement, (3) brake pedal releasing, or (4) deceleration below the linear range of the deceleration vs. pedal position relationship. If at least one of the blocks 96, 98, 100, 102 is answered in the affirmative, the blocks 104–124 are skipped, and the control unit 50 proceeds to block 126, as indicated by the circled letter B.

The data collection blocks 104–124 identify the brake pedal positions P1, P2, P3 corresponding to the respective predefined vehicle deceleration values D1, D2, D3, and periodically update a brake system characterization table corresponding to the graph of FIG. 3. The blocks 104, 110 and 116 respectively determine if the pedal positions P1, P2 and P3 have been identified, based on the status of the D1 FLAG, the D2 FLAG and the D3 FLAG. If block 104 determines that the D1 FLAG is not true, the block 106 determines if the difference (ACCEL−ACCEL_ONSET) has reached the predefined deceleration value identified in FIG. 3 as D1. If not, the data collection portion of the routine is exited; if so, the block 108 sets the D1 FLAG to true, and uses the current value of PP to update the pedal position variable P1 as shown. On the next execution of the routine, block 104 will be answered in the affirmative, and block 110 will determine if the D2 FLAG is true. If not, the block 112 determines if the difference (ACCEL−ACCEL_ONSET) has reached the predefined deceleration value identified in FIG. 3 as D2. If not, the data collection portion of the routine is exited; if so, the block 114 sets the D2 FLAG to true, and uses the current value of PP to update the pedal position variable P2 as shown. On the next execution of the routine, blocks 104 and 110 will both be answered in the affirmative, and block 116 will determine if the D3 FLAG is true. If not, the block 118 determines if the difference (ACCEL−ACCEL_ONSET) has reached the predefined deceleration value identified in FIG. 3 as D3. If not, the data collection portion of the routine is exited; if so, the block 120 sets the D3 FLAG to true, uses the current value of PP to update the pedal position variable P3, increments a brake event counter BEC_CTR, and sums the pedal position variables P1, P2 and P3 with corresponding position summation values PS1, PS2 and PS3. However, if the difference (ACCEL−ACCEL_ONSET) for the braking event fails to reach the deceleration value D3, the block 120 is not executed, and any pedal position data collected during the respective brake application is discarded.

After each successful data collection, the block 122 compares the brake event counter BEC_CTR to a calibrated threshold K_BEC indicative of the number of braking events needed to update the braking system characterization table. Thus, when BEC_CTR reaches K_BEC, the identified pedal position variables P1, P2, P3 for K_BEC (which may have a value of ten, for example) braking events will have been accumulated in the respective position summation values PS1, PS2, PS3. When this happens, the block 124 updates the braking system characterization table values PPCUR1, PPCUR2, PPCUR3 by dividing the respective pedal position summation values PS1, PS2, PS3 by the brake event counter BEC_CTR. In other words, PPCUR1=PS1/BEC_CTR, PPCUR2=PS2/BEC_CTR and PPCUR3=PS3/BEC_CTR. Block 124 also stores the current value of BRAKE_HEAT as UPDATE_BRAKE_HEAT, and resets the brake event counter BEC_CTR and the position summation values PS1, PS2, PS3 to zero.

Once the data collection portion of the routine has been completed or exited, the block 126 is executed to determine if the brake pedal position PP is at least as great as the lowest characterization value PPCUR1. If not, the blocks 127–134 are skipped; if so, the block 127 checks for insipient wheel lock. If insipient wheel lock is not detected, the routine is exited; if insipient wheel lock is detected, the block 128 sets the ABS FLAG to TRUE, and the block 129 determines the brake torque BRAKE_TQ using equation (1) and computes the yaw control slip and deceleration thresholds YAW_SLIP, YAW_DECEL as follows:

$$YAW\_SLIP = Kmax1 - [((BAR*K1\mathrm{rate}) - (BRAKE\_TQ*K1brtq))*Kys] \qquad (5)$$

$$YAW\_DECEL = Kmax2 - [((BAR*K2\mathrm{rate}) - (BRAKE\_TQ*K2brtq))*Kyd] \qquad (6)$$

where Kmax1 and Kmax2 are default values for the slip and deceleration thresholds, and K1rate, K2rate, K1brtq, K2brtq, Kys and Kyd are calibration gain terms, preferably chosen to drive YAW_SLIP and YAW_DECEL to zero when BAR and BRAKE_TQ are characteristic of a panic braking situation. The block 130 then determines if the differential slip or deceleration values DEL_SLIP, DEL_DECEL exceed the respective thresholds YAW_SLIP, YAW_DECEL. If not, the blocks 131 and 134 are executed to set the YAW FLAG to FALSE and to carry out the ABS control algorithm; if the slip or deceleration thresholds are exceeded, the blocks 132 sets the YAW FLAG to TRUE and updates the slip and deceleration targets SLIP_TARGET, DECEL_TARGET. The target values SLIP_TARGET and DECEL_TARGET may be computed as follows:

$$SLIP\_TARGET = MAX(SLIPlr, SLIPrr) - YAW\_SLIP \qquad (7)$$

$$DECEL\_TARGET = MAX(DECELlr, DECELrr) - YAW\_DECEL \qquad (8)$$

where MAX indicates a function that selects the maximum of the respective slip or deceleration values. Thus, in a panic braking situation, yaw control will be activated as soon as the braking produces a differential slip or deceleration of the rear wheels, and the yaw control will be based on the slip and deceleration of the low coefficient rear wheel. In a moderate braking situation, the yaw control will only be activated when the differential slip or deceleration exceed the respective thresholds, and when activated, the yaw control will be based on reduced slip and deceleration values. Finally, the block 134 is executed to carry out the ABS control algorithm. If the YAW FLAG is FALSE, the ABS control algorithm performs a conventional control in which the activation states for the respective modulators 38, 40, 42 are determined based on the measured slip and deceleration values for the respective wheels. In the YAW FLAG is TRUE, the activation state for the rear modulator 42 is determined based on the calculated slip and deceleration targets SLIP_TARGET, DECEL_TARGET.

In summary, the control of this invention provides an improved yaw control method in which a measure of braking intensity (brake apply rate and brake torque) is used to regulate both the initiation of yaw control and the selection of slip and deceleration targets once yaw control is initiated so that yaw control is initiated and carried out in a manner that provides yaw control at a level that is suited to the braking conditions, resulting in improved vehicle stability without unnecessarily increasing the vehicle stopping distance. Advantageously, the brake system characterization may also be used for diagnosing brake system abnormalities, as described in detail in the co-assigned U.S. Ser. No. 09/885,191. While described in reference to the illustrated embodiment, it is expected that various modifications in addition to those mentioned above will occur to those skilled in the art. For example, the described control is also applicable brake systems having independent rear brake control, and other types of vehicles, including electric or hybrid-electric vehicles that utilize regenerative braking to decelerate the vehicle. Thus, it will be understood that the scope of this invention is not limited to the illustrated embodiment, and that control methods incorporating these and other modifications may fall within the scope of this invention, which is defined by the appended claims.

What is claimed is:

1. A method of operation for a braking system for rear wheels of a vehicle including a driver-activated brake pedal and an ABS system effective when activated to modulate a rear brake pressure supplied to rear wheel brakes of the vehicle based on target slip and deceleration values for reducing yaw moments due to braking on split or uneven coefficient of friction road surfaces, the method comprising the steps of:

determining a measure of braking intensity;

determining a difference in slip or deceleration between the rear wheels;

defining a yaw entry threshold having a nominal value that is reduced in proportion to the measure of braking intensity; and activating said ABS system for modulating the rear brake pressure based on said target slip and deceleration values when the determined difference in slip or deceleration exceeds the yaw entry threshold.

2. The method of claim 1, wherein the step of determining a measure of braking intensity includes the steps of:

measuring a position of said brake pedal;

estimating a brake torque corresponding to the measured pedal position; and determining a rate of movement of said brake pedal when the driver is depressing said brake pedal;

wherein said measure of braking intensity includes the estimated brake torque and the determined rate of movement.

3. The method of claim 2, wherein the step of defining said yaw entry threshold includes the steps of:

reducing said nominal value in proportion to the estimated brake torque; and reducing said nominal value in proportion to the determined rate of movement of said brake pedal.

4. The method of claim 1, wherein said yaw entry threshold is reduced to a minimum value when said measure of braking intensity is characteristic of a panic braking situation.

5. The method of claim 1, including the steps of:

determining a difference in slip and a difference in deceleration between said rear wheels;

defining slip and deceleration thresholds, each having a nominal value that is reduced in proportion to the measure of braking intensity; and activating said ABS system when the determined difference in slip exceeds the defined slip threshold or the determined difference in deceleration exceeds the defined deceleration threshold.

6. The method of claim 1, including the steps of:

determining a difference in slip and a difference in deceleration between said rear wheels;

defining slip and deceleration thresholds, each having a nominal value that is reduced in proportion to the measure of braking intensity; and measuring slip and deceleration values of the rear wheels;

determining the target slip based on the highest of the measured slip values, reduced by said slip threshold; and determining the target deceleration based on the highest of the measured deceleration values, reduced by said deceleration threshold.

7. The method of claim 1, wherein said brake torque is estimated based on a periodically updated characterization of vehicle deceleration vs. brake pedal position when said ABS system is not activated.

8. A method of operation for a braking system for rear wheels of a vehicle including a driver-activated brake pedal and an ABS system effective when activated to modulate a rear brake pressure supplied to rear wheel brakes of the vehicle based on target slip and target deceleration values for reducing yaw moments due to braking on split or uneven coefficient of friction road surfaces, the method comprising the steps of:

determining a measure of braking intensity;

determining a difference in slip and a difference in deceleration between said rear wheels;

defining slip and deceleration thresholds, each having a nominal value that is reduced in proportion to the measure of braking intensity; and measuring slip and deceleration values of the rear wheels;

determining the target slip value based on the highest of the measured slip values, reduced by said slip threshold; and determining the target deceleration value based on the highest of the measured deceleration values, reduced by said deceleration threshold.

9. The method of claim 8, wherein the step of determining a measure of braking intensity includes the steps of:

measuring a position of said brake pedal;

estimating a brake torque corresponding to the measured pedal position; and determining a rate of movement of said brake pedal when the driver is depressing said brake pedal;

wherein said measure of braking intensity includes the estimated brake torque and the determined rate of movement.

10. The method of claim 9, wherein the step of defining said slip and deceleration thresholds includes the steps of:

reducing the nominal values of said slip and deceleration thresholds in proportion to the estimated brake torque; and reducing the nominal values of said slip and deceleration thresholds in proportion to the determined rate of movement of said brake pedal.

* * * * *